United States Patent [19]
Bapat

[11] Patent Number: 5,862,326
[45] Date of Patent: Jan. 19, 1999

[54] EFFICIENT REQUEST-REPLY PROTOCOL FOR A CLIENT-SERVER MODEL

[75] Inventor: Sanjay Bapat, San Diego, Calif.

[73] Assignee: Pacific Communication Sciences, Inc., San Diego, Calif.

[21] Appl. No.: 531,728

[22] Filed: Sep. 21, 1995

[51] Int. Cl.$^6$ .................................................. G06F 13/00
[52] U.S. Cl. ................................ 395/200.33; 395/200.31
[58] Field of Search .............................. 395/242.94, 800, 395/200.01, 240.8, 284.4, 200.03, 200.12, 200.09, 200.31, 200.33

[56] References Cited

U.S. PATENT DOCUMENTS

| | | | |
|---|---|---|---|
| 5,396,613 | 3/1995 | Hollar | 395/575 |
| 5,546,583 | 8/1996 | Shriver | 395/650 |

OTHER PUBLICATIONS

IBM Technical Disclosure Bulletin vol. 35, No. 1B "Dynamic Adjustment of Timer to Terminate Multicast Queries", Jun. 1992.

LaMaire, R.O., "Analysis of a Wireless MAC Protocol with Client–Server Traffic and Capture", IEEE Journal of Selected Areas in Communications, vol. 12, No. 8, Oct. 1994.

*Primary Examiner*—Kamini Shah
*Attorney, Agent, or Firm*—John Land; Martin J. Jaquez; Frank D. Nguyen

[57] ABSTRACT

An efficient request-reply protocol for a client-server communication and data processing model. Under the novel protocol, a client sends a Request to a server and awaits a Reply. If the Reply is not sent before expiration of a timeout period in the client, the client sends a second Request. The server provides a conditional Acknowledge if a second Request is received from the client. Thereafter, the client waits for the server to transmit a Reply without the client sending additional Requests. Under normal conditions, the inventive protocol performs as well as the best prior art protocol (the optimistic model), while under abnormal conditions, the inventive protocol performs better than the optimistic protocol and only slightly worse than the prior art pessimistic protocol. Since normal conditions should prevail for a substantially longer amount of time than abnormal conditions, the present invention provides better average performance than either prior art client-server protocol.

4 Claims, 3 Drawing Sheets

EFFICIENT REQUEST-REPLY PROTOCOL FOR A CLIENT-SERVER MODEL

BACKGROUND OF THE INVENTION

1. Field of the Invention

This invention relates to communication and data processing technology, and more particularly to an efficient request-reply protocol for a client-server communication and data processing model.

2. Description of Related Art

In recent architectures for data communication and data processing technologies, many user workstations are typically interconnected by a computer network. The network may be of the direct connection type (e.g., LAN or WAN) or a wireless type, or a combination of both.

Among current designs for such architectures, the "client-server" model has become a typical model in which computers on the network communicate with each other. A typical client-server interaction involves a client computer requesting a server computer to perform a certain operation, whereupon the server performs the operation and conveys the result back to the client.

Currently, there are two basic types of protocols used by the client and server to communicate with each other based on the two pacing parameters of this architecture—network performance and server performance. Network performance varies with, among other things, network reliability and load. Server performance varies with, among other things, load and operation complexity.

FIG. 1 is a ladder diagram showing the flow and timing of communications between a client-server system according to a first prior art protocol. This protocol takes a "pessimistic" view of network characteristics. As shown, a Request is initially transmitted by a client 10 to a server 12 over a communication network. The server 12 responds with an Acknowledge. The Acknowledge must be received by the client 10 within a first elapsed time period $TIMEOUT_{REQUEST}$ or an error occurs. Such an error may represent, for example, a disruption or failure by the server 12 or in the network. If the client 10 does not receive the Acknowledge before the $TIMEOUT_{REQUEST}$ time elapses, the client 10 retransmits the Request until the client 10 receives an Acknowledge. The timer value, $TIMEOUT_{REQUEST}$, is a function principally of the network characteristics. That is, the timer value is based upon some estimate as to how long an Acknowledge should take to be sent to the client 10 by the server 12.

After completing the requested operation, the server 12 responds back to the client with a Reply containing the result of the operation. If the client 10 does not receive the Reply within a second elapsed time period $TIMEOUT_{REPLY}$, measured from the receipt of the Acknowledge, the client 10 conveys an error to higher layers of the application software executing within the client 10. The timer value $TIMEOUT_{REPLY}$ is a function of a time estimate as to how long the server 12 should take to perform the desired operation.

The biggest advantage of this protocol is the separation of the network and the server 12 performance variables, so even if the server 12 takes a longer time to reply than expected, only 3 protocol data units (PDUs) are exchanged between the client 10 and the server 12 in the normal case. The problem with this protocol is that even for the best case scenario, where the Request is not lost by the underlying network, there is an extra Acknowledge. This extra PDU results in unnecessary wastage of network bandwidth, which usually is a very precious resource. This becomes more apparent in a wireless network, with many nodes competing for limited radio bandwidth.

FIGS. 2a and 2b are ladder diagrams showing the flow and timing of communications between a client-server system according to a second prior art protocol. This protocol takes an "optimistic" view of network characteristics. Again, a Request is initially transmitted by a client 10 to a server 12 over a communication network. A Reply is used to convey the result to the client 10. Since the Reply indirectly indicates receipt of the Request by the server 12, a separate Acknowledge signal directly indicating such is unnecessary. Thus, no separate Acknowledge is sent by the server 12. If the server 12 sends the Reply before a time period TIMEOUT elapses (i.e., the anticipated "normal" condition), only 2 PDUs are exchanged between the client 10 and the server 12, as shown in FIG. 2a. However, if the client 10 does not receive the Reply within the Timeout period, the client 10 retransmits the Request under the assumption that the prior Request was "lost" in the network.

Although this protocol is the most efficient for the best case scenario (only 2 PDUs exchanged), it behaves rather poorly when the operation performed on the server 12 takes a longer time than expected, as shown in FIG. 2b. When completion of the operation by the server 12 is delayed, the client 10 has no way to determine whether the Request was lost or whether the server 12 was delayed in completing the operation. The client 10 can only assume that the server 12 did not get the prior Request, and so retransmits the Request again. If the operation takes long enough, this can cause multiple retransmissions of the Request, resulting not only in wastage of the network bandwidth but possibly overloading the server 12 with more processing, which in turn could cause more delay in the operation being performed on the server 12.

Accordingly, it would be desirable to have a more efficient protocol for the client-server model in a data communication and processing system.

The present invention provides such an improved protocol.

SUMMARY OF THE INVENTION

The invention provides an efficient request-reply protocol for a client-server communication and data processing model. Under the novel protocol, a client sends a Request to a server and awaits a Reply. If the Reply is not sent before expiration of a timeout period in the client, the client sends a second Request. The server provides a conditional Acknowledge if a second Request is received from the client. Thereafter, the client waits for the server to transmit a Reply without the client sending additional Requests.

The details of the preferred embodiment of the present invention are set forth in the accompanying drawings and the description below. Once the details of the invention are known, numerous additional innovations and changes will become obvious to one skilled in the art.

DETAILED DESCRIPTION OF THE INVENTION

Throughout this description, the preferred embodiment and examples shown should be considered as exemplars, rather than as limitations on the present invention.

Figure 1:
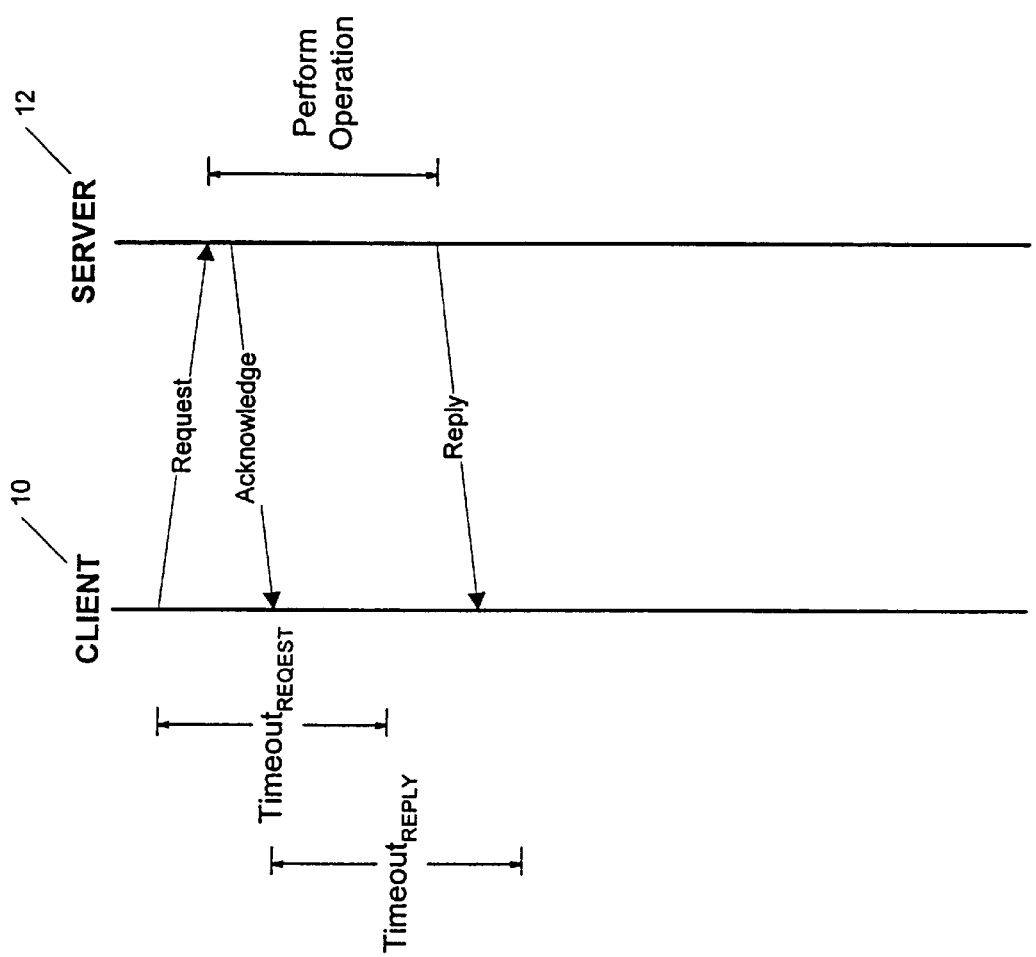
FIG. 1 is a ladder diagram showing the flow and timing of communications between a client-server system according to a first prior art protocol.
Figure 2B:
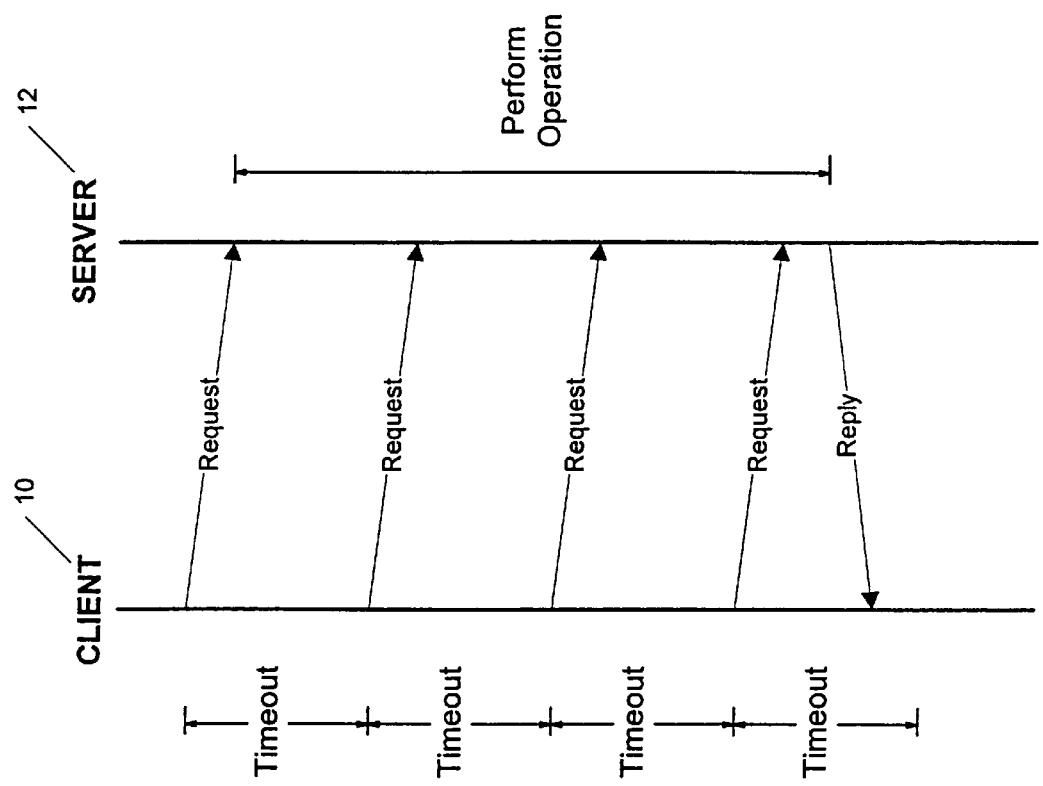
FIGS. 2a and 2b are ladder diagrams showing the flow and timing of communications between a client-server system according to a second prior art protocol.
Figure 2A:
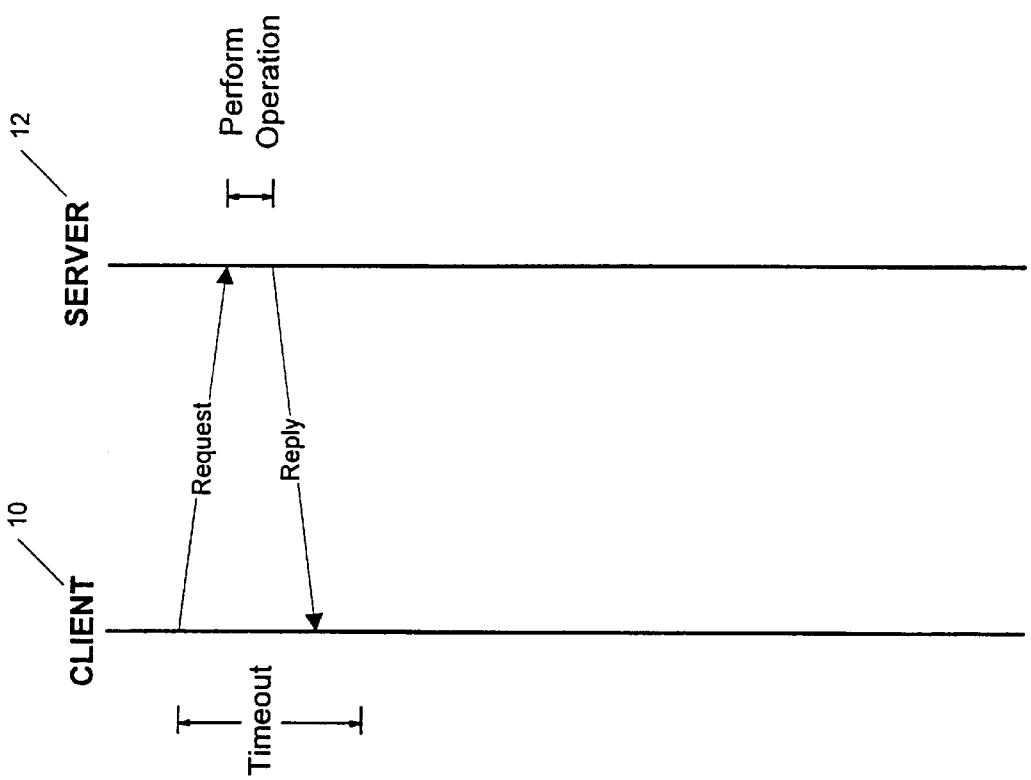
Figure 3B:
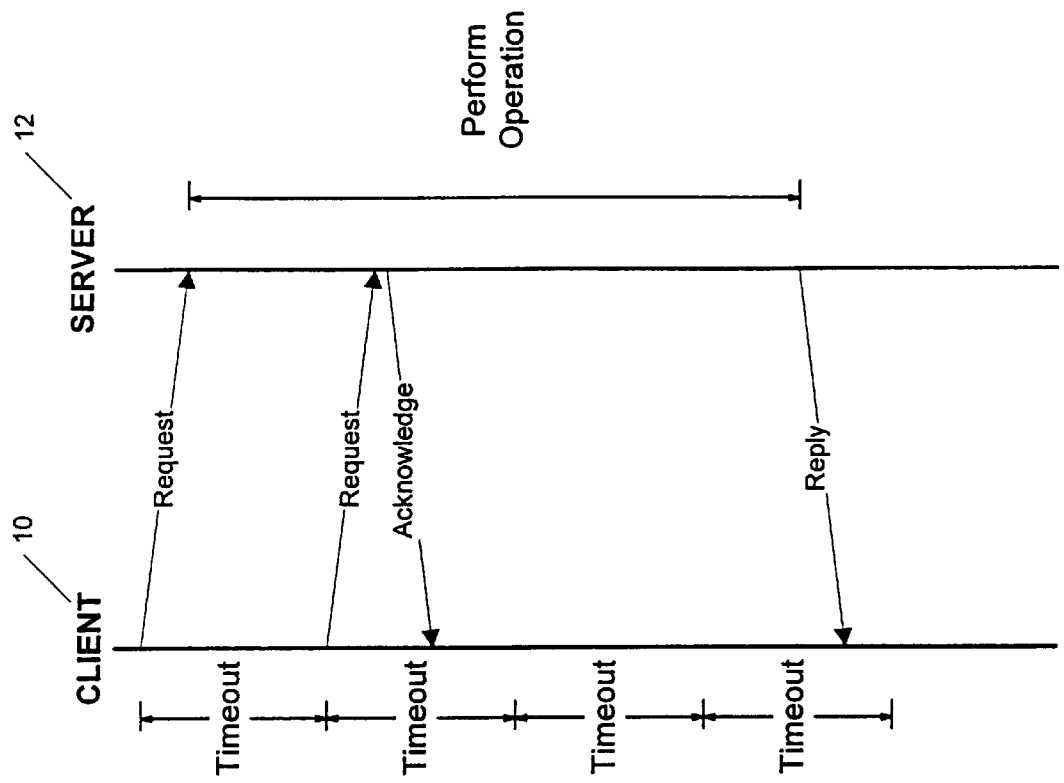
FIGS. 3a and 3b are ladder diagrams showing the flow and timing of communications between a client-server system according to the protocol of the present invention.
Figure 3A:
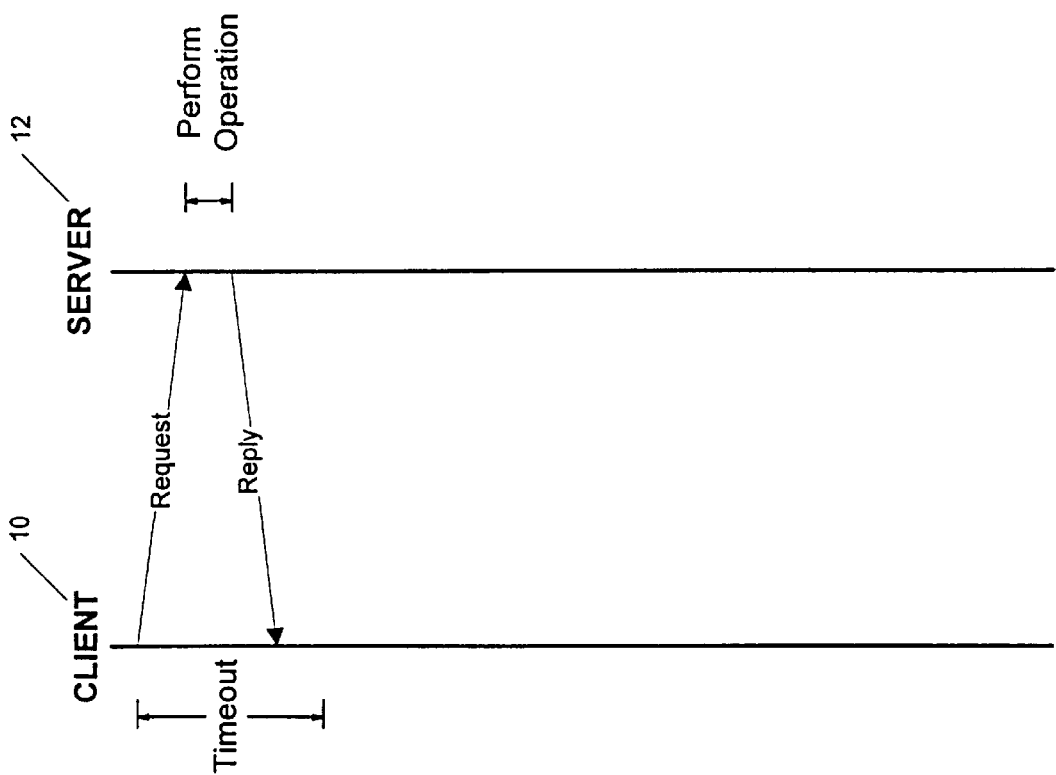

FIGS. 3a and 3b are ladder diagrams showing the flow and timing of communications between a client-server system according to the protocol of the present invention. The inventive protocol initially takes an "optimistic" view of network characteristics. A Request is initially transmitted by a client 10 to a server. 12 over a communication network. Under normal conditions, a Reply is used to convey the result to the client 10. Since the Reply indirectly indicates receipt of the Request by the server 12, a separate Acknowledge signal directly indicating such is unnecessary. If the server 12 sends the Reply before a time period TIMEOUT elapses (i.e., the anticipated "normal" condition), only 2 PDUs are exchanged between the client 10 and the server 12, as shown in FIG. 3a.

However, if the client 10 does not receive the Reply within the Timeout period, the client 10 retransmits the Request under the assumption that the prior Request was "lost" in the network. When the server 12 receives this duplicate Request, the server 12 recognizes that the client 10 is "impatient". To prevent further Requests from being sent for the same operation, the server 12 sends an Acknowledge to the client 10 to indicate that the server 12 did receive the Request. When the client 10 receives this Acknowledge, client 10 knows that the Request was successfully received by the server 12, and thus the client 10 need not retransmit the Request again as further Timeout periods elapse. The client 10 simply waits for the Reply to arrive.

If the client 10 does not receive an Acknowledge after the second Request, the client 10 assumes a network error has occurred, and continues to retransmit the Request (up to some selected maximum number of tries). If the client 10 does not receive an Acknowledge before the maximum number of Timeout periods elapses, the client 10 conveys an error to higher layers of the application software executing within the client 10.

In the best case of good performance by the network and the server, only 2 PDUs are exchanged between the client and the server, giving the same performance for the invention as the optimistic model during normal conditions. Under the worst case scenario, only 4 PDUs are exchanged between the client and the server (just one more than the pessimistic protocol). Accordingly, under normal conditions the inventive protocol performs as well as the best prior art protocol (the optimistic model), while under abnormal conditions, the inventive protocol performs better than the optimistic protocol and only slightly worse than the pessimistic protocol. Since normal conditions should prevail for a substantially longer amount of time than abnormal conditions, the present invention provides better average performance (i.e., fewer average PDUs) than either prior art client-server protocol.

The present invention provides a number of advantages over the prior art. The normally optimistic view of the network results in the most efficient usage of the network resource in the best case conditions. The ability to differentiate between network errors and the performance characteristics of the server 12 provides for the most efficient usage of network bandwidth in the worst case conditions. Further, the invention limits overloading of the server 12 in the worst case conditions.

The inventive protocol may be implemented as identical or complementary computer programs executing on the client 10 and server 12, respectively. Each computer program is preferably stored on a storage media or device (e.g., ROM or magnetic diskette) readable by a general or special purpose computer, for configuring and operating the computer when the storage media or device is read by the computer to perform the protocol described above. The inventive protocol may also be considered to be implemented as a computer-readable storage medium, configured with a computer program, where the storage medium so configured causes a computer to operate in a specific and predefined manner to perform the protocol described above.

A number of embodiments of the present invention have been described. Nevertheless, it will be understood that various modifications may be made without departing from the spirit and scope of the invention. Accordingly, it is to be understood that the invention is not to be limited by the specific illustrated embodiment, but only by the scope of the appended claims.

What is claimed is:

1. A method for communicating between a client and a server coupled by a network, comprising:
   (a) transmitting a request to perform an operation, from a client to a server over a network;
   (b) retransmitting the request to perform the operation, if the client does not receive a reply conveying a result of the request, from the server before a time period elapses;
   (c) transmitting an acknowledge signal indicating receipt of the retransmitted request by the server, from the server to the client over the network, if the server receives the retransmitted request before generating the reply; and
   (d) transmitting the reply from the server to the client after the server has generated the reply.

2. The method according to claim 1, further comprising after step (c),
   (e) suspending further retransmissions of the request from the client to the server, in response to receipt by the client of the acknowledge signal.

3. A method executed by a client in communicating with a server over a network, comprising:
   (a) transmitting a request to perform an operation to a server over a network;
   (b) waiting for a reply conveying a result of the request from the server;
   (c) retransmitting the request to the server only if the reply is not received from the server before a time period elapses;
   (d) waiting for the earlier arriving of the reply or an acknowledge signal indicating receipt of the retransmitted request by the server; and
   (e) suspending retransmissions of the request to the server, if the earlier arriving of the reply or the acknowledge signal is received from the server before the time period elapses, otherwise retransmitting the request to the server and jumping back to step (d).

4. A method executed by a server in communicating with a client over a network, comprising:
   (a) receiving a request from a client over a network, and taking no action in response to the request to transmit an acknowledge signal indicating receipt of the request back to the client;

(b) generating a reply conveying a result of the request;
(c) transmitting an acknowledge signal to the client, if a retransmission of the request is received from the client before the reply is generated; and (b) transmitting the reply conveying the result of the request to the client, after generating the reply.

* * * * *